(12) United States Patent
Jo

(10) Patent No.: US 11,655,868 B2
(45) Date of Patent: *May 23, 2023

(54) DRUM BRAKE APPARATUS

(71) Applicant: HYUNDAI MOBIS CO., LTD., Seoul (KR)

(72) Inventor: Chi Hoon Jo, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 41 days.

This patent is subject to a terminal disclaimer.

(21) Appl. No.: 17/356,098

(22) Filed: Jun. 23, 2021

(65) Prior Publication Data

US 2021/0396289 A1    Dec. 23, 2021

(30) Foreign Application Priority Data

Jun. 23, 2020  (KR) .......................... 10-2020-0076096

(51) Int. Cl.
*F16D 65/22* (2006.01)
*F16D 65/02* (2006.01)

(52) U.S. Cl.
CPC ............. *F16D 65/22* (2013.01); *F16D 65/02* (2013.01); *F16D 2065/1304* (2013.01)

(58) Field of Classification Search
CPC ............. F16D 2121/24; F16D 2125/40; F16D 2125/48; F16D 2123/00; F16D 2121/02; F16D 2125/52; F16D 65/12; F16D 65/22; F16D 2129/10; F16D 55/32; F16D 65/10; F16D 2125/08

See application file for complete search history.

(56) References Cited

U.S. PATENT DOCUMENTS

| | | | | |
|---|---|---|---|---|
| 3,744,595 A | * | 7/1973 | Adams | F16D 65/09 188/79.64 |
| 3,811,538 A | * | 5/1974 | Farr | F16D 59/02 188/196 D |
| 6,405,838 B1 | * | 6/2002 | Shaw | B60T 13/741 188/106 P |
| 8,556,045 B2 | * | 10/2013 | Schmandt | F16D 51/48 188/106 P |

(Continued)

FOREIGN PATENT DOCUMENTS

| | | | |
|---|---|---|---|
| JP | 6602307 B2 * | 11/2019 | .............. B60T 13/02 |
| KR | 10-2018-0047519 A | 5/2018 | |

OTHER PUBLICATIONS

English translation of JP 6602307 B2 (Year: 2019).*

*Primary Examiner* — Robert A. Siconolfi
*Assistant Examiner* — Mahbubur Rashid
(74) *Attorney, Agent, or Firm* — Morgan, Lewis & Bockius LLP

(57) ABSTRACT

A drum brake apparatus includes: a housing; a main braking unit disposed on a first portion of the housing, and the main braking unit configured to be, during main braking, driven by a hydraulic pressure and pressing a shoe; a parking braking unit disposed on a second portion of the housing, the parking braking unit configured to be, during parking braking, driven by an electromotive force of an actuator and pressing the shoe; a first locking member configured to couple the housing to one surface of a back plate; and a second locking member configured to couple the actuator to the housing on another surface side of the back plate.

13 Claims, 11 Drawing Sheets

(56) References Cited

U.S. PATENT DOCUMENTS

| | | | |
|---|---|---|---|
| 9,175,737 B2 * | 11/2015 | Bach | F16D 65/16 |
| 9,440,626 B2 * | 9/2016 | Akada | F16D 51/48 |
| 2012/0205209 A1 * | 8/2012 | Tsuzuku | F16D 65/58 |
| | | | 188/325 |
| 2014/0027221 A1 * | 1/2014 | Akada | F16D 51/50 |
| | | | 188/325 |
| 2020/0018365 A1 * | 1/2020 | Barbosa | F16D 51/24 |
| 2020/0055505 A1 * | 2/2020 | Choi | B60T 13/741 |
| 2020/0056667 A1 * | 2/2020 | Choi | B60T 1/067 |

* cited by examiner

SECTION A-A'

SECTION B-B'

DRUM BRAKE APPARATUS

CROSS-REFERENCE TO RELATED APPLICATION

This application claims the benefit of priority to Korean Patent Application No. 10-2020-0076096 filed on Jun. 23, 2020 in the Korean Intellectual Property Office, the entire disclosure of which is incorporated herein by reference for all purposes.

BACKGROUND

Technical Field

Exemplary embodiments of the present disclosure relate to a drum brake apparatus, and more particularly, to a drum brake apparatus which generates a braking force through friction with a drum rotating together with a wheel.

Discussion of the Background

In general, a drum brake refers to an apparatus which generates a braking force through friction with a drum rotating together with a wheel. That is to say, the drum brake refers to an apparatus which acquires a braking force by rubbing a shoe, to which a friction member is attached, against a drum through using a hydraulic pressure (main braking) or using a cable connected to a parking brake lever (parking braking).

A conventional drum brake includes a drum, a pair of shoes which are disposed on a back plate to face the inner circumferential surface of the drum and each have a friction member attached to the outer circumferential surface thereof, and a wheel cylinder for main braking, which moves the shoes outward by receiving a hydraulic braking pressure. The drum brake further includes an actuation lever for a parking brake, which has one end axially coupled to the shoes and the other end connected through a cable to a parking brake lever installed laterally of a driver's seat. Thus, when the parking brake lever is pulled, parking braking is mechanically performed.

In the conventional art, a main brake device which performs main braking and a parking brake device which performs parking braking are separately fabricated and installed. Since the main brake device and the parking brake device are separately fabricated and managed, assembly positions capable of securing a clearance in consideration of the interference between the main brake device and the parking brake device need to be set and adjusted depending on a specification, and then design and assembly need to be performed. Therefore, due to inconveniences caused therefrom, the productivity may be degraded and the fabrication cost may increase.

Therefore, there is a need to solve such a problem.

The foregoing explained as the background is intended merely to aid in the understanding of the background of the present disclosure, and is not intended to mean that the present disclosure falls within the purview of the related art that is already known to those skilled in the art.

SUMMARY

Various embodiments are directed to an integrated type drum brake apparatus capable of performing main braking and parking braking together.

In an embodiment, a drum brake apparatus may include: a housing; a main braking unit disposed on a first portion of the housing, the main braking unit configured to be, during main braking, driven by a hydraulic pressure and pressing a shoe; a parking braking unit disposed on a second portion of the housing, the parking braking unit configured to be, during parking braking, driven by an electromotive force of an actuator and pressing the shoe; a first locking member configured to fasten the housing to a first surface of a back plate; and a second locking member configured to fasten the actuator to the housing on a second surface side of the back plate.

The housing may include: a housing body; a piston receiving body disposed to be connected to a first portion of the housing body, the piston receiving body configured to be hollow in which the main braking unit is disposed; and a rod receiving disposed to be connected to a second portion of the housing body to be hollow, the rod receiving body having the parking braking unit therein and spaced apart from, farther than the piston receiving body, a rotation center of the shoe.

The housing body may include: a body part having the piston receiving body and the rod receiving body; a first fastening part disposed on the body part, and configured to be coupled to the back plate by the first locking member; a through extension part disposed at an end of the body part, the through extension part disposed on the second surface side of the back plate and extending through a through hole of the back plate; and a second fastening part, to which the second locking member is locked, disposed on the through extension part.

The first fastening part may include: a left fastening part disposed on a left side portion of the body part, and configured to be coupled to the back plate by the first locking member; and a right fastening part disposed on a right side portion of the body part, and configured to be coupled to the back plate by the first locking member, wherein the through extension part is disposed between the left fastening part and the right fastening part.

The piston receiving body may include: a cylinder part in which the main braking unit is disposed; and a hydraulic flow path part extending from both sides of the through extension part to the cylinder part so as to define a path through which a fluid is supplied into the cylinder part, wherein the second fastening part is disposed at a middle portion in a lateral direction of the through extension part and spaced apart from the hydraulic flow path part.

The drum brake apparatus may further include: a rotation preventing assembly unit configured to prevent rotation of the actuator about the second locking member between the housing and the actuator, wherein the rod receiving body includes: a rod cylinder in which the parking braking unit is disposed; and a driving shaft receiving part, in which an output shaft of the actuator is disposed and connected to the parking braking unit, extending from the through extension part to the rod cylinder part, wherein the second fastening part is disposed on a first side of the driving shaft receiving part and spaced apart from the first fastening part, and wherein the rotation preventing assembly unit is disposed on a second side of the driving shaft receiving part opposite to the first side of the driving shaft receiving part based on a center portion of the driving shaft receiving part.

The rotation preventing assembly unit may include: a rotation preventing groove through which an edge portion of the driving shaft receiving part communicates with the rotation preventing assembly unit, the rotation preventing groove configured to be recessed in an extending direction of the driving shaft receiving part; and a rotation preventing projection extending on the actuator and configured to be fitted into the rotation preventing groove.

The housing body may further include: a foreign matter introduction prevention part coupled to a side of the body part at which the piston receiving body and the rod receiving body have openings, respectively, wherein the foreign matter introduction prevention part is configured to enclose an edge portion of the piston receiving body and an edge portion of the rod receiving body.

The foreign matter introduction prevention part may include: a connecting portion disposed between the opening of the piston receiving body and the opening of the rod receiving body; a piston sealing portion having a ring shape corresponding to the edge portion of the piston receiving body, the ring shape of the piston sealing portion being continuous with a first portion of the connecting portion, wherein the piston sealing portion has an inner end connected to the main braking unit; a rod sealing portion having a ring shape corresponding to the edge portion of the rod receiving body, the ring shape of the rod sealing portion continuous with a second portion of the connecting portion, wherein the rod sealing portion has an inner end connected to the parking braking unit; and a body fixing portion disposed on the connecting portion, and fixed to the body part.

The piston receiving body and the rod receiving body may be disposed on the same radial extension line with respect to a rotation center of the back plate; and the actuator may be disposed on the same radial extension line as a chassis which supports a center portion of the back plate, and may be disposed parallel to the rotation center of the back plate.

The main braking unit may include: a piston disposed at an end of the housing, and the piston configured to reciprocate to be in and out of the housing by a hydraulic pressure and pressing the shoe; and an elastic member disposed in the housing so as to reduce an impact force applied to the piston returning into the housing.

The parking braking unit may include: a gear rotatably disposed in the housing, and rotated in association with the actuator; and a rod connected with the gear, the rod configured to press the shoe when moving out of the housing in association with the gear.

The drum brake apparatus may further include: a rotation preventing assembly unit spaced apart from the second locking member, so as to prevent rotation of the actuator about the second locking member by fitting assembly between the housing and the actuator.

The rotation preventing assembly unit may include: a rotation preventing groove disposed on one of the housing and the actuator; and a rotation preventing projection extending on the other of the housing and the actuator through the rotation preventing groove.

According to the embodiments of the present disclosure, the drum brake apparatus may disclose an integrated main braking and parking braking structure in which a main braking unit and a parking braking unit are coupled to each other in one housing. Thus, a main bake device and a parking brake device may be simultaneously installed through a simple process of installing a housing on a back plate.

Therefore, according to the embodiments of the present disclosure, when compared to the conventional art in which a main brake device and a parking brake device are separately fabricated and managed, assembly positions capable of securing a clearance in consideration of the interference between the main brake device and the parking brake device are set and adjusted depending on a specification and then design and assembly are performed, a manufacturing process may be simplified and a distance between the main braking unit and the parking braking unit may be further decreased. As a consequence, it is possible to realize size and weight reduction and improve space utilization efficiency.

In addition, according to the embodiments of the present disclosure, by locking a first locking member and a second locking member to a housing, a plurality of components including an actuator, a back plate and the housing may be firmly coupled to one another in a state in which the housing and the actuator are disposed on one side and the other side, respectively, of the back plate.

Also, according to the embodiments of the present disclosure, since the first locking member and the second locking member are assembled in the state in which the housing and the actuator are disposed on the one side and the other side, respectively, of the back plate, the stiffness and structural stability of the back plate may be further improved as compared to a case where the housing and the actuator are pre-assembled and are then post-assembled to the back plate and thus a large hole for the passage of the actuator should be formed in the back plate.

Further, according to the embodiments of the present disclosure, since only the actuator may be solely and easily disassembled by unlocking the second locking member, the replacement and inspection of the actuator may be performed more easily as compared to a case where one locking member is locked by continuously passing through the actuator, the back plate and the housing.

DETAILED DESCRIPTION OF THE ILLUSTRATED EMBODIMENTS

Hereinafter, a drum brake apparatus will be described below with reference to the accompanying drawings through various examples of embodiments. It should be noted that the drawings are not to precise scale and may be exaggerated in thickness of lines or sizes of components for descriptive convenience and clarity only. Furthermore, the terms as used herein are defined by taking functions of the invention into account and can be changed according to the custom or intention of users or operators. Therefore, definition of the terms should be made according to the overall disclosure set forth herein.

Figure 1:
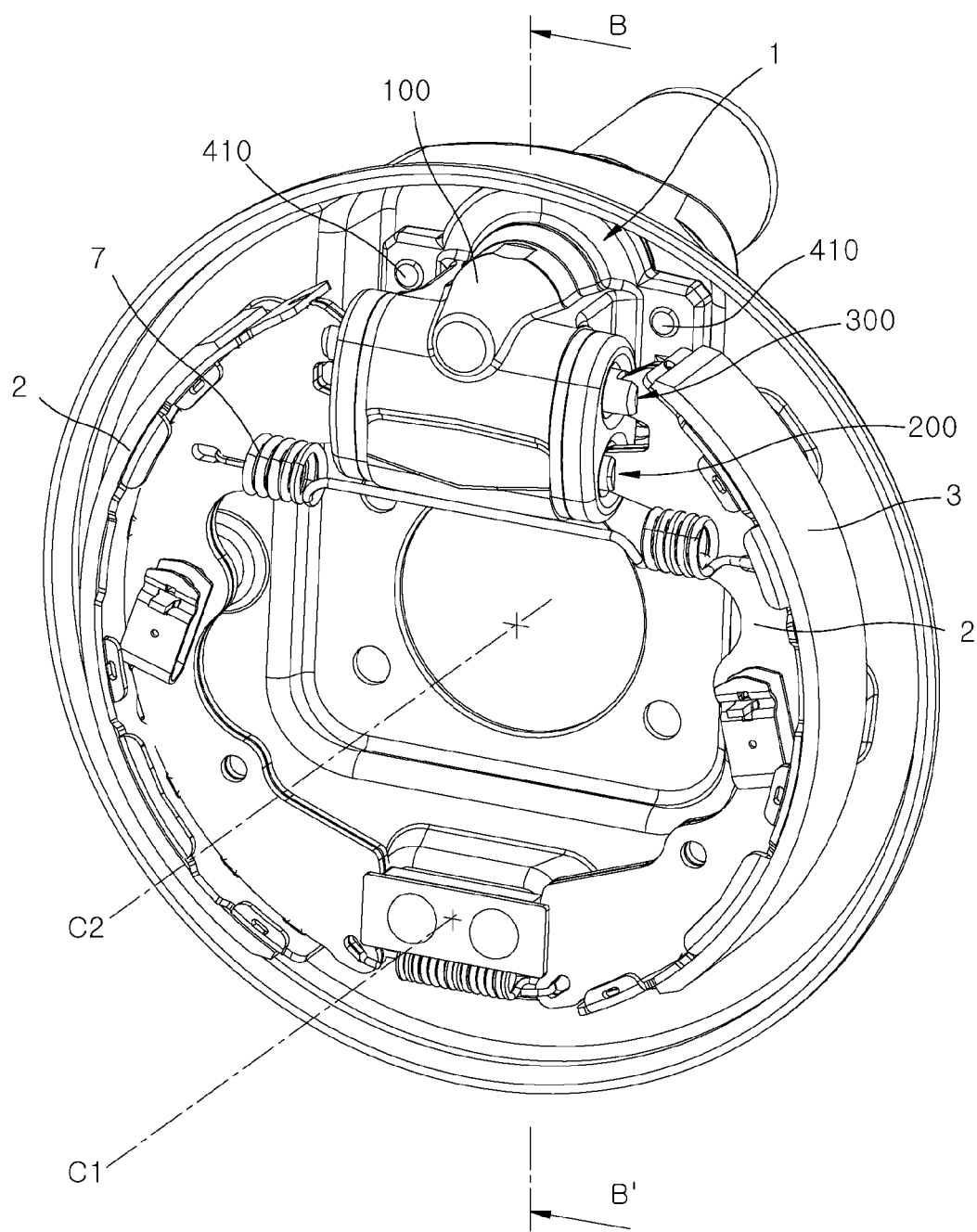
FIG. 1 is a front perspective view illustrating an installation state of a drum brake apparatus in accordance with an embodiment of the present disclosure.
Figure 2:
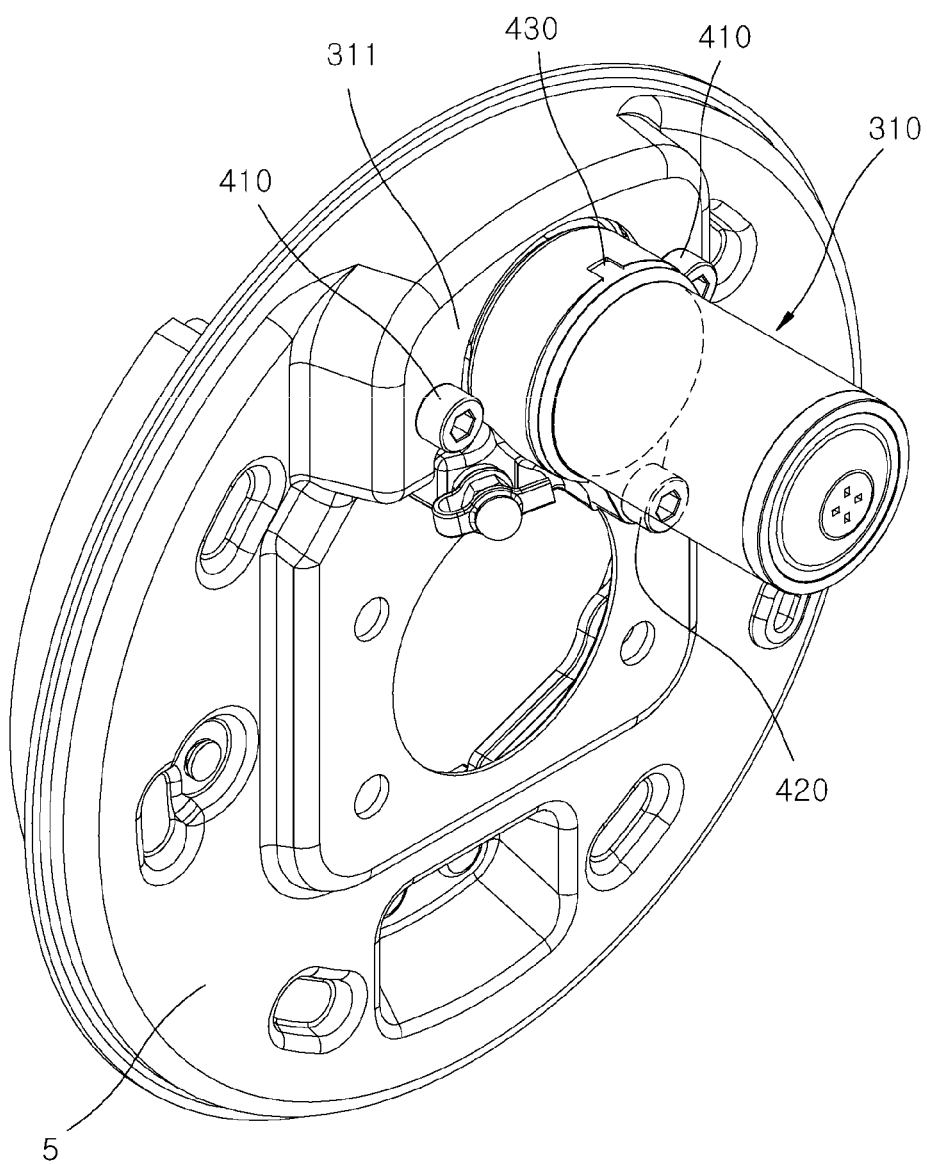
FIG. 2 is a rear perspective view illustrating the installation state of the drum brake apparatus in accordance with the embodiment of the present disclosure.
Figure 3:
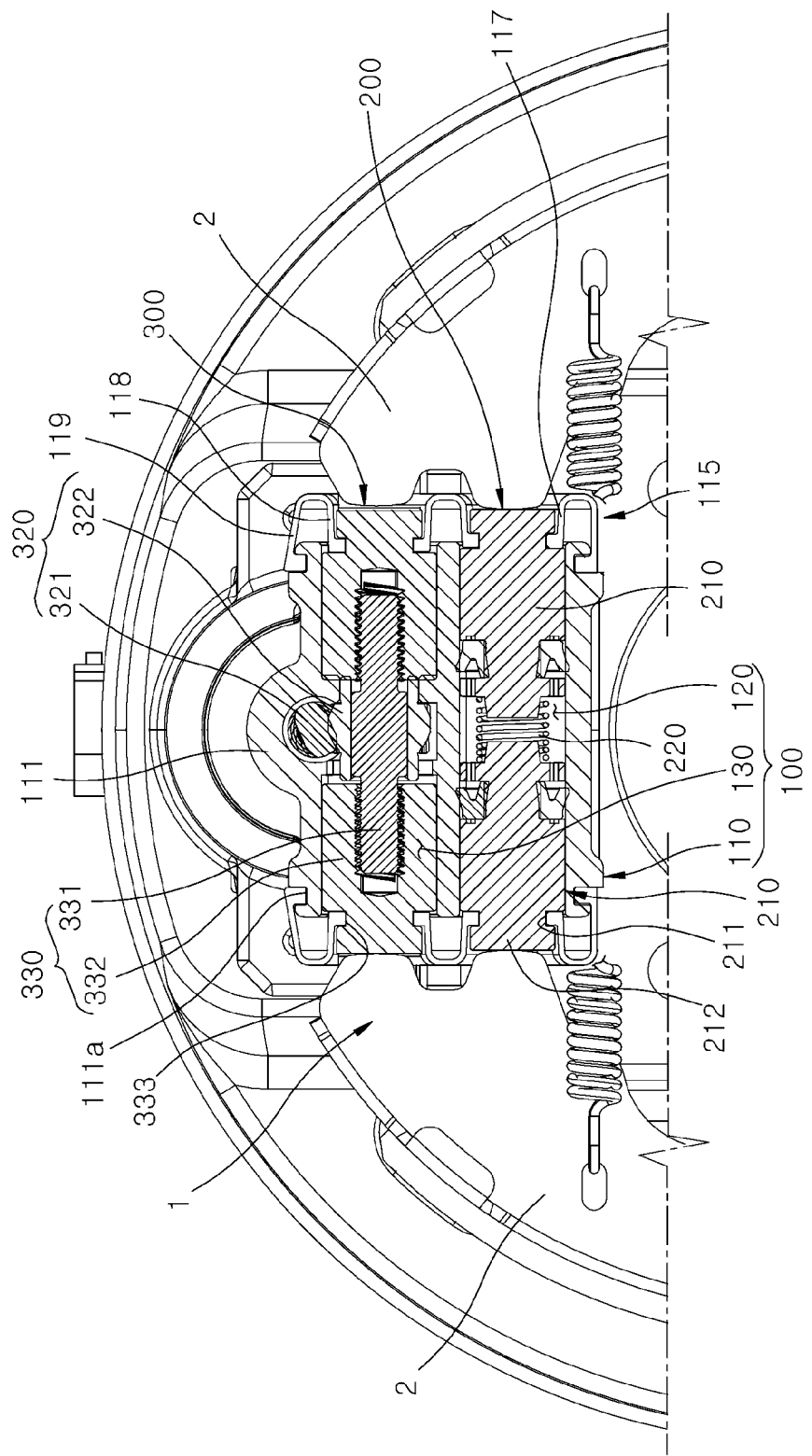
FIG. 3 is a cross-sectional view illustrating main components of the drum brake apparatus in accordance with the embodiment of the present disclosure.

FIG. 1 is a front perspective view illustrating an installation state of a drum brake apparatus in accordance with an embodiment of the present disclosure, FIG. 2 is a rear perspective view illustrating the installation state of the drum brake apparatus in accordance with the embodiment of the present disclosure, and FIG. 3 is a cross-sectional view illustrating main components of the drum brake apparatus in accordance with the embodiment of the present disclosure.

Referring to FIGS. 1 to 3, a drum brake apparatus 1 in accordance with an embodiment of the present disclosure includes a housing 100, a main braking unit 200, a parking braking unit 300, a first locking member 410, a second locking member 420, and a rotation preventing assembly unit 430.

The housing 100 is disposed between a pair of left and right shoes 2. The main braking unit 200 is installed on one part of the housing 100, and is driven by a hydraulic pressure upon main braking so as to press the shoes 2. The parking braking unit 300 is installed on the other part of the housing 100, and is driven by an electromotive force upon parking braking so as to press the shoes 2. Both ends of the main braking unit 200 are installed so as to be engaged with one side portions of the shoes 2, and both ends of the parking braking unit 300 is installed so as to be engaged with the other side portions of the shoes 2 with a predetermined distance from the main braking unit 200.

The first locking member 410 fastens the housing 100 at a predetermined position on one surface of a back plate 5. The first locking member 410 is locked to the housing 100 by passing through the back plate 5, and thereby, couples the back plate 5 and the housing 100 to each other.

The second locking member 420 fastens an actuator 310 to an end of the housing 100 which is disposed on the other side of the back plate 5 by passing through the back plate 5. The second locking member 420 fastens the actuator 310 to the housing 100 on the other surface of the back plate 5. The second locking member 420 is locked to the housing 100 by passing through the actuator 310, and thereby, couples the actuator 310 and the housing 100 to each other.

By sequentially locking the first locking member 410 and the second locking member 420, the actuator 310, the back plate 5 and the housing 100 may be firmly coupled to one another in a state in which the housing 100 and the actuator 310 are disposed on the one side and the other side, respectively, of the back plate 5.

The rotation preventing assembly unit 430, as a device unit for preventing the rotation and movement of the actuator 310, is disposed to be separated from the second locking member 420, and prevents the rotation and movement of the actuator 310 about the second locking member 420 by the fitting assembly between the housing 100 and the actuator 310.

Referring to FIG. 3, the housing 100 in accordance with the embodiment of the present disclosure includes a housing section 110, a piston receiving section 120, and a rod receiving section 130.

The housing section 110, as a section which forms a basic framework of the housing 100, has the shape of a block. The piston receiving section 120, as a section in which the main braking unit 200 is installed, is formed to be hollow in one part of the housing section 110. The rod receiving section 130, as a section in which the parking braking unit 300 is installed, is formed to be hollow in the other part of the housing section 110 with a predetermined distance from the piston receiving section 120.

Figure 4:
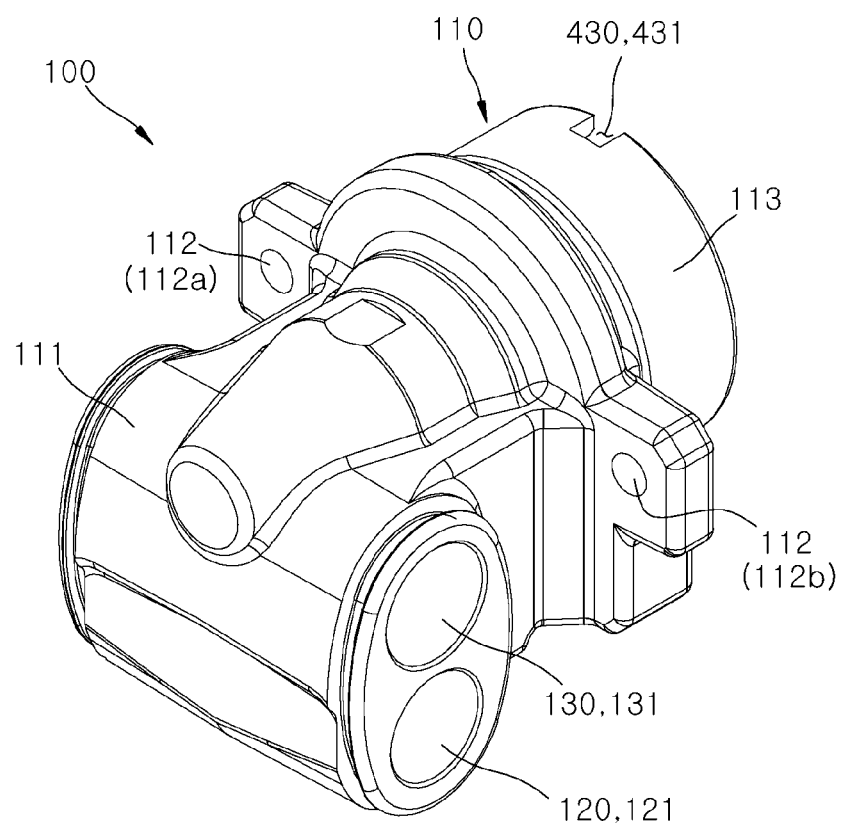
FIG. 4 is a front perspective view illustrating a housing of the drum brake apparatus in accordance with the embodiment of the present disclosure.
Figure 5:
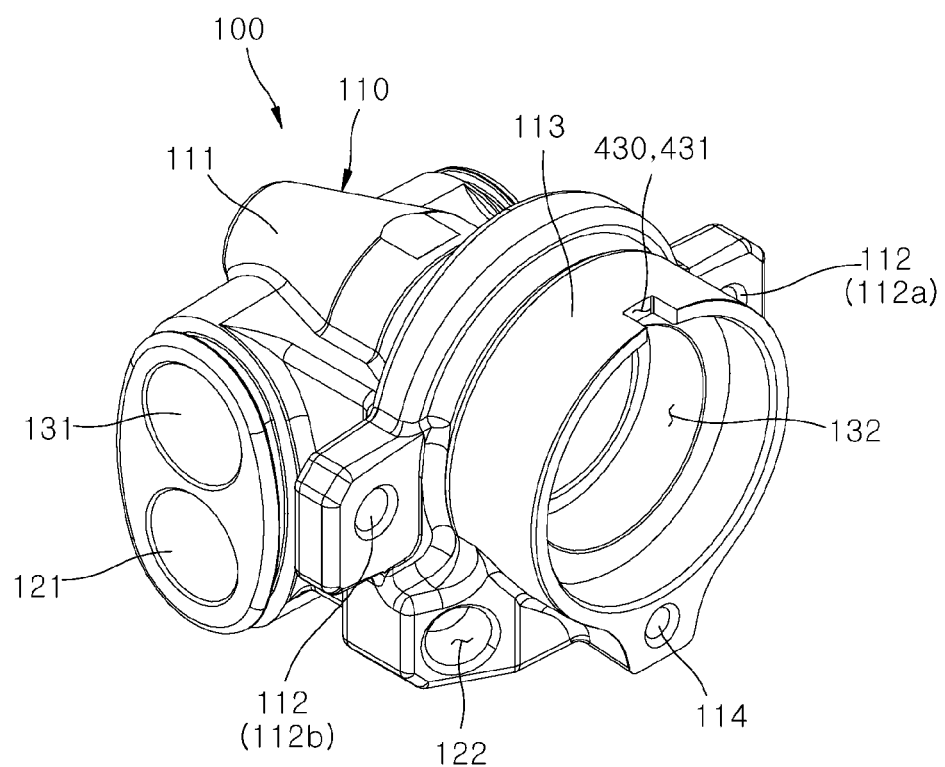
FIG. 5 is a rear perspective view illustrating the housing of the drum brake apparatus in accordance with the embodiment of the present disclosure.
Figure 6:
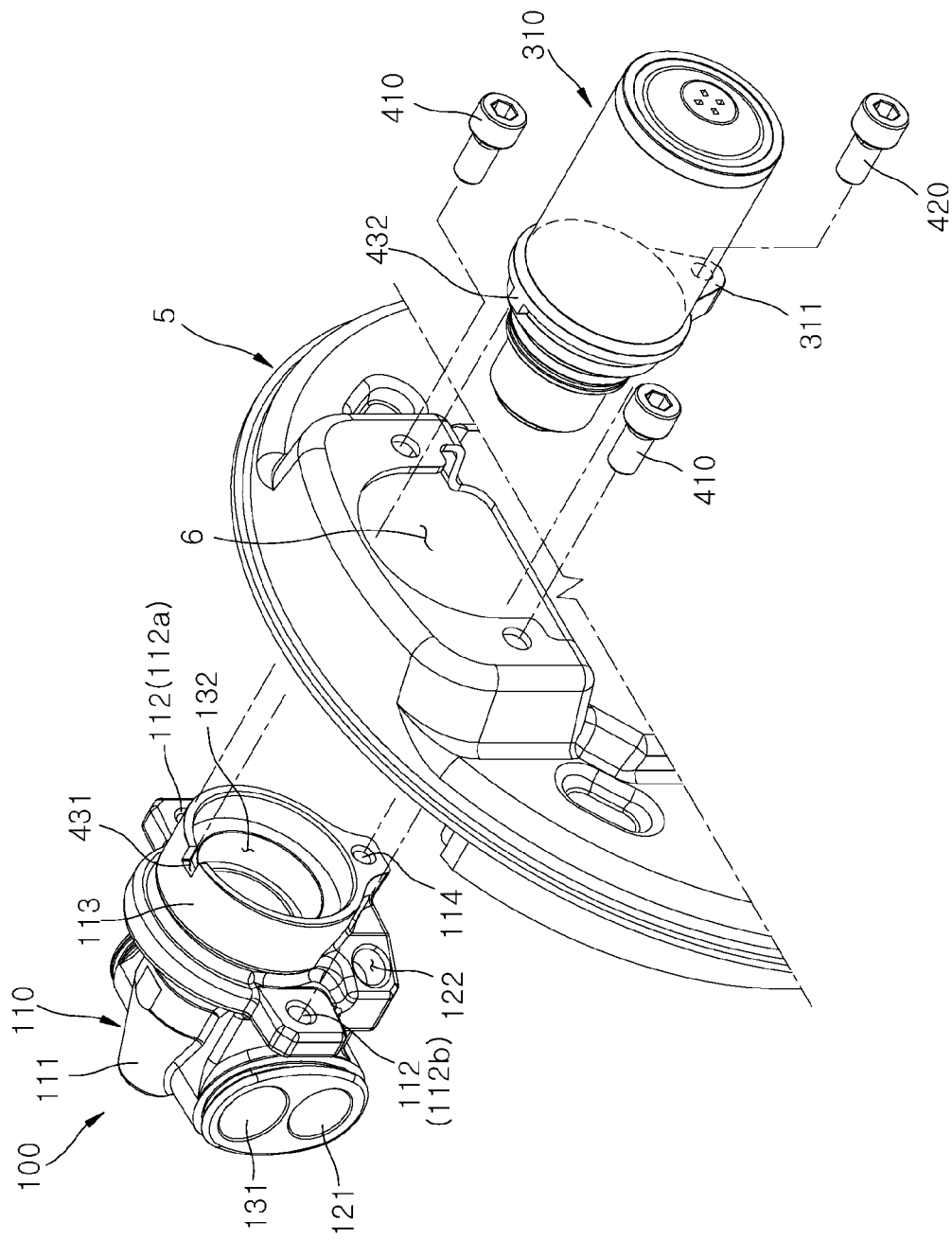
FIG. 6 is an exploded perspective view illustrating main components of the drum brake apparatus in accordance with the embodiment of the present disclosure.

FIG. 4 is a front perspective view illustrating the housing of the drum brake apparatus in accordance with the embodiment of the present disclosure, FIG. 5 is a rear perspective view illustrating the housing of the drum brake apparatus in accordance with the embodiment of the present disclosure, and FIG. 6 is an exploded perspective view illustrating main components of the drum brake apparatus in accordance with the embodiment of the present disclosure.

Referring to FIGS. 4 to 6, the housing section 110 in accordance with the embodiment of the present disclosure includes a body part 111, a first fastening part 112, a through extension part 113, a second fastening part 114, and a foreign matter introduction prevention part 115.

The body part 111 serves as a device part which forms the body of the housing section 110, and the piston receiving section 120 and the rod receiving section 130 are formed in the body part 111 to be hollow. The piston receiving section 120 and the rod receiving section 130 are formed in the body part 111 to extend in a lateral direction and be open at both ends thereof.

The body part 111 and the actuator 310 are disposed on the one side and the other side, respectively, of the back plate 5 with the back plate 5 interposed therebetween. Hereinafter, for the sake of convenience in explanation, disposition relationships among components, directions and so forth will be described by setting the one side of the back plate 5, on which the body part 111 is disposed, as the front and setting the other side of the back plate 5, on which the actuator 310 is disposed, as the rear.

The first fastening part 112, as a device part which is fastened to a front surface of the back plate 5 by the first locking member 410, is formed on left and right sides of the body part 111. The first fastening part 112 in accordance with the embodiment of the present disclosure includes a left fastening part 112a and a right fastening part 112b, and at least two first locking members 410 are provided to be locked to the left fastening part 112a and the right fastening part 112b, respectively.

The left fastening part 112a is formed on the left side of the body part 111, and one first locking member 410 passes through a left portion of the back plate 5 from the rear and is locked to the left fastening part 112a which is positioned at the front. The right fastening part 112b is formed on the right side of the body part 111, and the other first locking member 410 passes through a right portion of the back plate 5 from the rear and is locked to the right fastening part 112b which is positioned at the front.

Each of the left fastening part 112a and the right fastening part 112b is formed with a hole or a groove into which the first locking member 410 may be fitted and locked, and an internal thread to which the first locking member 410 having an external thread may be threadedly locked is formed in the hole or the groove. By locking the plurality of first locking members 410 to the left fastening part 112a and the right fastening part 112b disposed on left and right sides of the housing 100, the housing 100 may be firmly fastened at is the predetermined position on the back plate 5 so as not to be moved and rotated.

The through extension part 113 is formed at a rear end of the body part 111, passes through a through hole 6, formed in the back plate 5, from the front to the rear, and is disposed on a rear surface of the back plate 5, that is, at the rear of the back plate 5. The actuator 310 is coupled and fastened to the through extension part 113 positioned at the rear of the back plate 5, and thereby, is firmly disposed at a predetermined position behind the back plate 5.

At a position on the through extension part 113 corresponding to the parking braking unit 300, there are formed a driving shaft receiving part 132 of the rod receiving section 130 for coupling of the actuator 310, the second fastening part 114 and a rotation preventing groove 431 of the rotation preventing assembly unit 430. At a position on the through extension part 113 corresponding to the main braking unit 200, there is formed a hydraulic flow path part 122 of the piston receiving section 120.

In detail, the through extension part 113 is disposed between the pair of left and right first fastening parts 112, that is, the left fastening part 112a and the right fastening part 112b. The driving shaft receiving part 132 is disposed on a line extending from the left fastening part 112a to the right fastening part 112b, that is, connecting the pair of left and right first locking members 410.

The second fastening part 114, as a device part which is coupled with the actuator 310 by the second locking member 420, is formed on a lower rear surface portion of the through extension part 113. In detail, the second fastening part 114 is formed on a lower side of the driving shaft receiving part 132, and is disposed between a pair of left and right hydraulic flow path parts 122. Namely, the second fastening part 114 is disposed at a middle portion in a lateral direction of the through extension part 113 in such a way to be separated from the pair of left and right hydraulic flow path parts 122.

The pair of left and right hydraulic flow path parts 122 have an extension structure in which a separation distance between the pair of left and right hydraulic flow path parts 122 gradually decreases toward a front side where a cylinder part 121 is positioned. In order to stably secure a separation distance from the pair of left and right hydraulic flow path parts 122, one second locking member 420 may be locked to the second fastening part 114.

A locking part 311 through which the second locking member 420 may pass is formed at a lower portion of the actuator 310. The second locking member 420 passes through the locking part 311 from the rear of the actuator 310 and is locked to the second fastening part 114 at the front. The second fastening part 114 is formed with a hole or a groove into which the second locking member 420 may be fitted and locked, and an internal thread to which the second locking member 420 having an external thread may be threadedly locked is formed in the hole or the groove.

Figure 7:
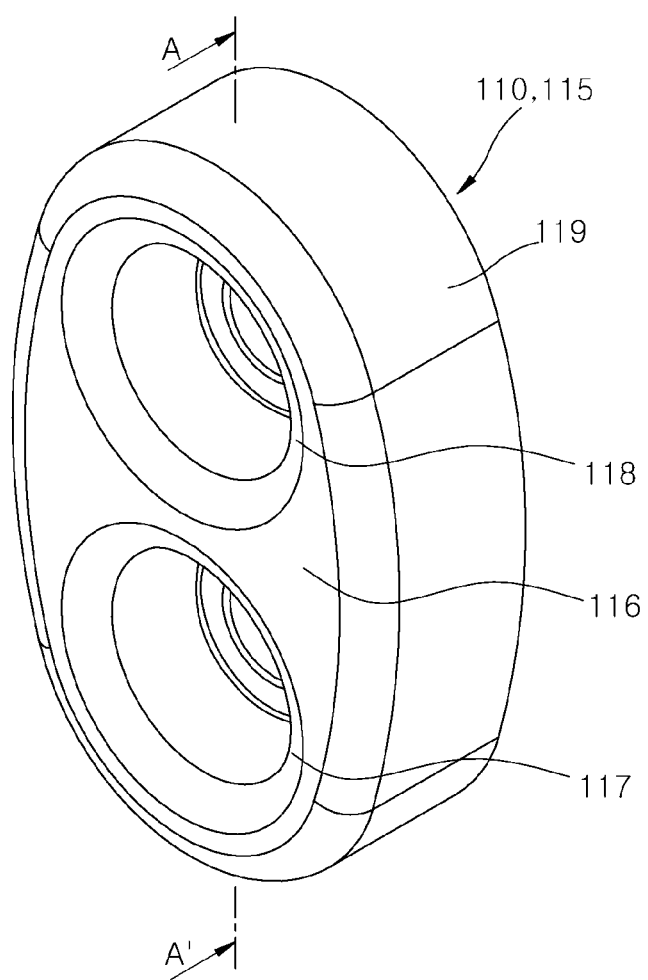
FIG. 7 is a perspective view illustrating a foreign matter introduction prevention part of the drum brake apparatus in accordance with the embodiment of the present disclosure.
Figure 8:
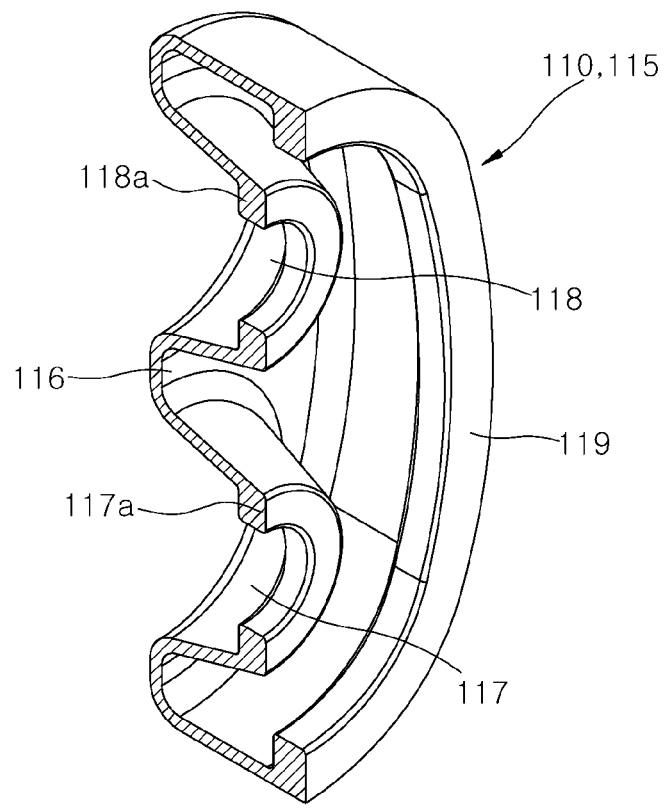
FIG. 8 is a cross-sectional view taken along the line A-A' of FIG. 7.

FIG. 7 is a perspective view illustrating the foreign matter introduction prevention part of the drum brake apparatus in accordance with the embodiment of the present disclosure, and FIG. 8 is a cross-sectional view taken along the line A-A' of FIG. 7.

The foreign matter introduction prevention part 115, as a device part which prevents foreign matters from being introduced into the piston receiving section 120 and the rod receiving section 130, is coupled to each side of the body part 111 at which openings of the piston receiving section 120 and the rod receiving section 130 are positioned. The opening of the piston receiving section 120 means each open side end of the piston receiving section 120, and the opening of the rod receiving section 130 means each open side end of the rod receiving section 130.

The foreign matter introduction prevention part 115 is made of a soft or flexible material, and is installed on the body part 111 to cover the opening of the piston receiving section 120 and the opening of the rod receiving section 130, in more detail, to cover a gap between the piston receiving section 120 and a piston 210 and a gap between the rod receiving section 130 and a push rod 332. Referring to FIGS. 7 and 8, the foreign matter introduction prevention part 115 in accordance with the embodiment of the present disclosure includes a connecting portion 116, a piston sealing portion 117, a rod sealing portion 118, and a body fixing portion 119.

The connecting portion 116 is disposed between the opening of the piston receiving section 120 and the opening of the rod receiving section 130 which are formed at the side of the body part 111. The piston sealing portion 117 has a shape capable of covering each side of the piston receiving section 120, and is formed continuously with a lower portion of the connecting portion 116. The rod sealing portion 118 has a shape capable of covering each side of the rod receiving section 130, and is formed continuously with an upper portion of the connecting portion 116.

When the piston receiving section 120 is disposed below the rod receiving section 130, the connecting portion 116 is disposed between the piston receiving section 120 and the rod receiving section 130, the piston sealing portion 117 is integrally formed with the connecting portion 116 under the connecting portion 116, and the rod sealing portion 118 is integrally formed with the connecting portion 116 on the connecting portion 116.

A circular hole corresponding to the edge of the opening of the piston receiving section 120 is formed in the piston sealing portion 117. Referring to FIG. 3, an inner circumferential portion 117a of the piston sealing portion 117 is coupled with the main braking unit 200 across the opening of the piston receiving section 120. In more detail, the inner circumferential portion 117a of the piston sealing portion 117 is airtightly connected with the piston 210 of the main braking unit 200 by being fitted into a first coupling groove 211 formed around the piston 210.

A circular hole corresponding to the edge of the opening of the rod receiving section 130 is formed in the rod sealing portion 118. Referring to FIG. 3, an inner circumferential portion 118a of the rod sealing portion 118 is connected with the parking braking unit 300 across the opening of the rod receiving section 130. In more detail, the inner circumferential portion 118a of the rod sealing portion 118 is connected with the push rod 332 of the parking braking unit 300 by being fitted into a second coupling groove 333 formed around the push rod 332.

A fluid for creating a hydraulic pressure atmosphere may be introduced into the piston receiving section 120, and a lubricant for smooth operation of a gear section 320 and a rod section 330 may be introduced into the rod receiving section 130. The piston sealing portion 117 and the rod sealing portion 118 may prevent the fluid and lubricant in the piston receiving section 120 and the rod receiving section 130 from leaking to the outside through the openings and at the same time prevent foreign matters from being introduced into the main braking unit 200 and the parking braking unit 300.

The body fixing portion 119, as a device portion which is coupled with the body part 111, has a ring shape which continuously extends along front and rear end portions of the connecting portion 116, a lower edge portion of the piston sealing portion 117 and an upper edge portion of the rod sealing portion 118, and is formed to project toward the body part 111 by a predetermined thickness. By fitting and fixing the body fixing portion 119 into a third coupling groove 111a formed around the body part 111, the piston sealing portion 117 and the rod sealing portion 118 may be firmly coupled to the body part 111.

By the above-described structure, the foreign matter introduction prevention part 115 serves to prevent the main braking unit 200 from being released to the outside of the piston receiving section 120 and at the same time prevent the parking braking unit 300 from being released to the outside of the rod receiving section 130, while not hindering the operation of the main braking unit 200 and the parking braking unit 300.

Referring to FIGS. 4 to 7, the piston receiving section 120 in accordance with the embodiment of the present disclosure includes the cylinder part 121 and the hydraulic flow path part 122.

The cylinder part 121, as a space part in which the main braking unit 200 is received, is formed in the housing section 110 to have a circular space shape. The cylinder part 121 is formed to cross the housing section 110 in a left-and-right direction, and is formed to be open at both ends thereof on both sides of the housing section 110. The hydraulic flow path part 122, as a part which forms a fluid supply path for creating a hydraulic pressure atmosphere in the cylinder part 121, is formed to extend from an outer surface of the housing section 110 to the cylinder part 121.

An outer end of the hydraulic flow path part 122 is formed to be open at the through extension part 113 which is formed on a rear surface of the body part 111. Since the through extension part 113 is exposed to the rear side of the back plate 5 through the through hole 6, the fluid may be stably supplied into the cylinder part 121 through the hydraulic flow path part 122 from the rear side of the back plate 5 without interference with a plurality of parts including the pair of shoes 2 installed on the front side of the back plate 5.

An inner end of the hydraulic flow path part 122 which communicates with the cylinder part 121 is formed to face an elastic member 220 of the main braking unit 200 which is installed in the cylinder part 121. The separation distance between the pair of left and right hydraulic flow path parts 122 gradually decreases from the outer ends thereof toward the inner ends thereof in such a way as to define a V-shape. Accordingly, the fluid introduced into the hydraulic flow path parts 122 flows toward the elastic member 220 disposed at a middle portion of the cylinder part 121.

By such a structure of the hydraulic flow path part 122, the fluid introduced into the cylinder part 121 may be evenly distributed and diffused in the cylinder part 121 while being interfered with the elastic member 220, which makes it possible to prevent the fluid from concentratedly and repeatedly applying shock to an inner wall of the cylinder part 121 or a side of the piston 210 while the fluid is introduced into the cylinder part 121.

Referring to FIGS. 4 to 7, the rod receiving section 130 in accordance with the embodiment of the present disclosure includes a rod cylinder part 131 and the driving shaft receiving part 132.

The rod cylinder part 131, as a space part in which the rod section 330 of the parking braking unit 300 and a driven gear 322 of the gear section 320 are received, is formed in the housing section 110 to have a circular space shape. The rod cylinder part 131 is disposed parallel to the cylinder part 121 while crossing the housing section 110 in the left-and-right direction, and is formed to be open at both ends thereof on both sides of the housing section 110.

The driving shaft receiving part 132, as a space part in which a driving gear 321 of the gear section 320 of the parking braking unit 300 and an output shaft of the actuator 310 are received, is formed to communicate with the rod cylinder part 131. The output shaft of the actuator 310 is inserted into the inside of the housing section 110 through the driving shaft receiving part 132, and is connected with the gear section 320 of the parking braking unit 300.

The rod cylinder part 131 is disposed with the predetermined distance from the piston receiving section 120. The distance between the rod cylinder part 131 and the piston receiving section 120 may be applied by being freely changed within a range in which the rod cylinder part 131 and the piston receiving section 120 do not interfere and communicate with each other. The more the distance between the rod cylinder part 131 and the piston receiving section 120 is decreased, the more a volume and weight of the housing section 110 may be reduced.

The above-described structure may realize size reduction to a degree that is impossible to realize in the conventional art in which a main brake device and a parking brake device are separately provided and thus a thickness of a casing of the main brake device, a thickness of a casing of the parking brake device and a clearance between the main brake device and the parking brake device are all reflected.

Referring to FIGS. 1 and 3, the main braking unit 200 in accordance with the embodiment of the present disclosure includes the piston 210 and the elastic member 220.

The piston 210 presses or releases the shoe 2 against or from a drum (not illustrated) while being moved into and out of the cylinder part 121 along the cylinder part 121 by a hydraulic pressure. In the embodiment of the present disclosure, a pair of left and right pistons 210 are disposed at both ends, respectively, of the cylinder part 121. The first coupling groove 211 and a shoe coupling part 212 are formed on an end portion of each piston 210 which is exposed out of the cylinder part 121.

The first coupling groove 211 is formed in a circular shape along an outer circumferential surface of the piston 210, and the inner circumferential portion 117a of the piston sealing portion 117 is fitted and coupled into the first coupling groove 211. As the inner circumferential portion 117a of the piston sealing portion 117 is fitted and fixed into the first coupling groove 211, the cylinder part 121 is sealed. The shoe coupling part 212 has a slit shape, that is, a clamp shape, into which an end of the shoe 2 may be inserted, and is installed to be engaged with the shoe 2.

When the fluid is introduced through the hydraulic flow path part 122, as a pressure in the cylinder part 121 increases, the pair of left and right pistons 210 are moved such that a separation distance between the pair of left and right pistons 210 is increased, and push the pair of left and right shoes 2. Through this process, main braking is performed. When the fluid is discharged through the hydraulic flow path part 122, as a pressure in the cylinder part 121 decreases, the pair of left and right pistons 210 are moved such that a separation distance between the pair of left and right pistons 210 is decreased, and release a pushed state of the pair of left and right shoes 2. Through this process, the main braking is released.

The elastic member 220 is disposed in the cylinder part 121 between the pair of pistons 210. As the elastic member 220 is disposed between the pair of pistons 210, the elastic member 220 prevents the pair of pistons 210 from directly colliding with each other while the pair of pistons 210 return to the inside of the cylinder part 121, and reduces an impact force applied to the pistons 210. Furthermore, as the elastic member 220 interferes with the fluid introduced between the pair of pistons 210 through the hydraulic flow path part 122, the elastic member 220 may evenly distribute and diffuse a hydraulic pressure. As the elastic member 220, an elastic spring or the like may be applied.

Referring to FIGS. 1 and 3, the parking braking unit 300 in accordance with the embodiment of the present disclosure includes the actuator 310, the gear section 320 and the rod section 330.

The gear section 320, as a device section which receives a rotational driving force from the actuator 310 and transfers the rotational driving force to the rod section 330, has a worm wheel gear structure and is disposed in the rod receiving section 130. The driving gear 321 of the gear section 320 has the structure of a worm gear, is installed in the driving shaft receiving part 132, and is coaxially connected to the output shaft of the actuator 310 which is inserted into the driving shaft receiving part 132. The driven gear 322 of the gear section 320 has the structure of a wheel gear which is meshed with the worm gear, and is disposed at a middle portion of the rod cylinder part 131.

The rod section 330, as a device section which converts a rotational displacement of the gear section 320 into a linear displacement and transfers the linear displacement to each shoe 2, includes a rotation rod 331 and the push rod 332 and is installed in the rod cylinder part 131. The rotation rod 331 is formed as one rod member, and is coaxially connected to the driven gear 322. The push rod 332 includes a threaded coupling part with respect to the rotation rod 331 and is threadedly coupled around both end portions of the rotation rod 331. The push rod 332 is moved into and out of the rod cylinder part 131 in association with the rotational movement of the rotation rod 331, and presses or releases the shoe 2 against or from the drum 2.

In the embodiment of the present disclosure, a pair of left and right push rods 332 are disposed at both end portions, respectively, of the rod cylinder part 131. An end portion of each push rod 332, which is exposed out of the rod cylinder part 131, has the same structure as the end portion of the piston 210 which is formed with the first coupling groove 211 and the shoe coupling part 212. As the inner circumferential portion 118a of the rod sealing portion 118 is fitted and fixed into the second coupling groove 333 formed on the outer circumferential surface of the push rod 332, the rod cylinder part 131 is sealed by the rod sealing portion 118. The end portion of the push rod 332 has a slit shape into which an end of the shoe 2 may be inserted, and is installed to be engaged with the shoe 2.

When the actuator 310 is driven in a forward direction, a rotational force of the actuator 310 is transferred to the rotation rod 331 through the gear section 320, and the rotation rod 331 is rotated in the forward direction in association with the gear section 320. At this time, the pair of push rods 332 are moved along the rotation rod 331 such that a separation distance between the pair of push rods 332 is increased, and push the pair of left and right shoes 2.

In a state in which the pistons 210 press the shoes 2, parking braking is performed through the process described above. When the actuator 310 is driven in a backward direction, the pair of push rods 332 are moved such that a separation distance between the pair of push rods 332 is decreased, and release a pushed state of the pair of left and right shoes 2. Through this process, the parking braking is released.

Figure 9A:
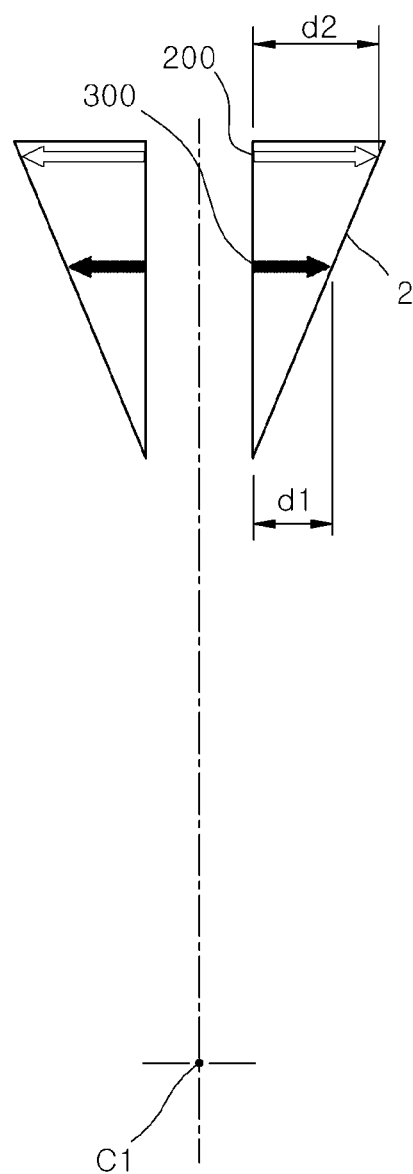
FIG. 9A and FIG. 9B are a conceptual view to assist in the explanation of tolerances depending on the disposition of a main braking unit and a parking braking unit in the drum brake apparatus in accordance with the embodiment of the present disclosure.
Figure 9B:
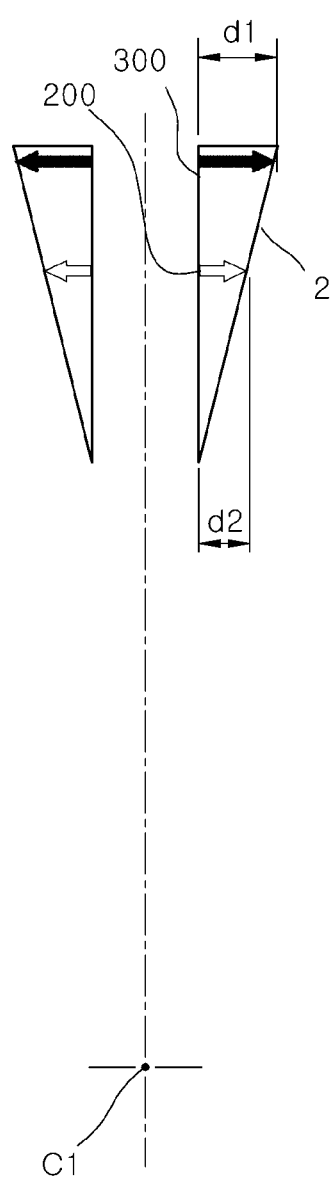
Figure 10:
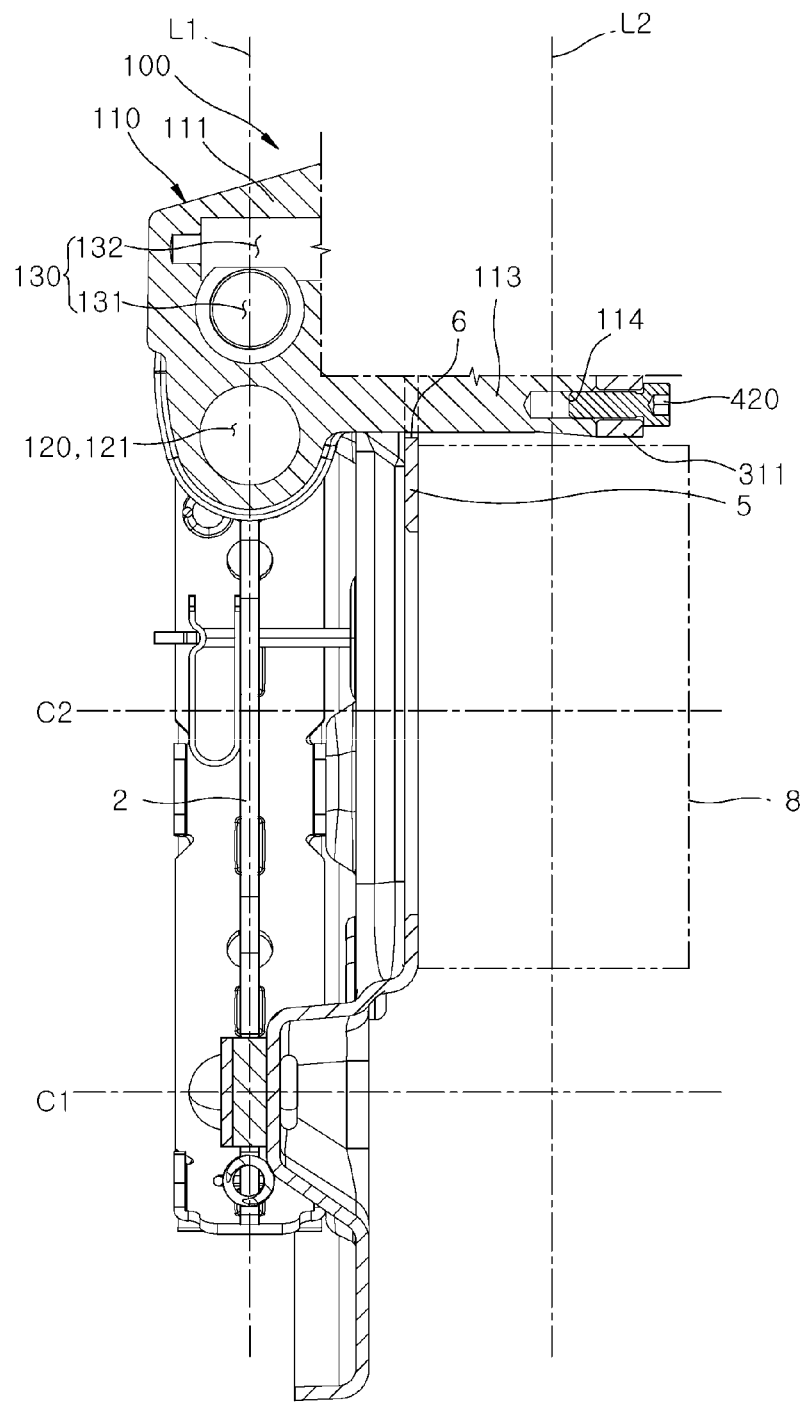
FIG. 10 is a cross-sectional view taken along the line B-B' of FIG. 1.

FIG. 9A and FIG. 9B are a conceptual view to assist in the explanation of tolerances depending on the disposition of the main braking unit and the parking braking unit in the drum brake apparatus in accordance with the embodiment of the present disclosure, and FIG. 10 is a cross-sectional view taken along the line B-B' of FIG. 1.

While a drum brake is used, a friction pad 3 attached to the shoe 2 is worn, and a gap between the shoe 2 and the drum (not illustrated) changes due to such wear of the friction pad 3. The gap between the shoe 2 and the drum may be calibrated by the parking braking unit 300 so as to be constantly maintained even though the friction pad 3 is worn.

A length of the parking braking unit 300 is flexibly changed depending on a driving state of the actuator 310, and a separation distance between the pair of shoes 2 may be substantially determined depending on a length of the parking braking unit 300 in a state in which the pair of shoes 2 are applied with a pressing force by an elastic member 7 in directions in which the pair of shoes 2 approach each other.

When the actuator 310 is driven in the forward direction, as a length of the parking braking unit 300 is increased to push the pair of left and right shoes 2 in opposite directions in which the pair of shoes 2 are separated from each other, the parking braking is performed. When the actuator 310 is driven in the backward direction, a pressing force which has pushed the shoes 2 is removed to release the parking braking. Depending on a driving amount of the actuator 310 in the backward direction, a gap between the shoe 2 and the drum may be adjusted and calibrated.

Referring to FIGS. 1 and 10, the rod receiving section 130 is disposed at a position separated farther than the piston receiving section 120 from a rotation center C1 of the shoe 2. This means that the parking braking unit 300 installed in the rod receiving section 130 is disposed at a position separated farther than the main braking unit 200, installed in the piston receiving section 120, from the rotation center C1 of the shoe 2.

FIG. 9A illustrates, in an example in which the main braking unit 200 is disposed at a position separated farther than the parking braking unit 300 from the rotation center C1 of the shoe 2, a relative size of a tolerance d2 of the main parking unit 200 with respect to a tolerance d1 of the parking braking unit 300. FIG. 9B illustrates, in the embodiment in which the parking braking unit 300 is disposed at a position separated farther than the main braking unit 200 from the rotation center C1 of the shoe 2, a relative size of the tolerance d2 of the main parking unit 200 with respect to the tolerance d1 of the parking braking unit 300.

In the case where the main braking unit 200 is disposed at a position separated farther than the parking braking unit 300 from the rotation center C1 of the shoe 2, if the tolerance d1 occurs when a return position of the shoe 2 or a gap between the shoe 2 and the drum is adjusted and calibrated by the parking braking unit 300 as described above, the tolerance d2 of the main braking unit 200 becomes larger than the tolerance d1 of the parking braking unit 300 (d2>d1) as illustrated in FIG. 9A.

As in the embodiment of the present disclosure, when the rod receiving section 130 is disposed at a position separated farther than the piston receiving section 120 from the rotation center C1 of the shoe 2, the tolerance d2 of the main braking unit 200 becomes smaller than the tolerance d1 of the parking braking unit 300 (d2<d1) as illustrated in FIG. 9B. Therefore, when the parking braking unit 300 has the tolerance d1 of the same degree with respect to the shoe 2, the main braking unit 200 has the smaller tolerance d2 in the embodiment of the present disclosure than that in the example in which the main braking unit 200 is disposed at a longer distance than the parking braking unit 300 from the rotation center C1 of the shoe 2.

By disposing the rod receiving section 130 at a position separated farther than the piston receiving section 120 from the rotation center C1 of the shoe 2, the tolerance d2 of the main braking unit 200 may be surely reduced with respect to the tolerance d1 of the parking braking unit 300 that occurs in the same degree, as described above. Accordingly, even when the tolerance d2 occurs in the course of calibrating a gap between the shoe 2 and the drum by the parking braking unit 300, the operational reliability of the main braking unit 200 may be stably maintained.

Referring to FIG. 10, the piston receiving section 120 and the rod receiving section 130 of the housing 100 are disposed on the one side (front surface side) of the back plate 5, and the actuator 310 is disposed on the other side (rear surface side) of the back plate 5. The back plate 5 is supported at the center portion thereof by a chassis 8 of a vehicle body, and the chassis 8 is disposed on the other side of the actuator 310.

By disposing the parking braking unit 300 at a position separated farther than the main braking unit 200 from the rotation center C1 of the shoe 2, the actuator 310 of the parking braking unit 300 may be disposed to be separated farther from a rotation center C2 of the back plate 5. Thus, the actuator 310 does not need to be disposed by being tilted in consideration of interference with the chassis 8, or a complicated structure, in which a stepped portion is formed on a portion of the housing section 110 facing the chassis 8, does not need to be applied.

In other words, when the actuator 310 is disposed on the same radial extension line L2 as the chassis 8 which supports the center portion of the back plate 5, the actuator 310 may not need to be tilted downward toward the front in order to minimize the interference with the chassis 8, and may be disposed parallel to the rotation center C2 of the back plate 5.

Therefore, without difficulties in design and fabrication for disposing the piston receiving section 120 and the rod receiving section 130 in a direction perpendicular to the output shaft of the actuator 310 by compositely considering an inclination of the actuator 310, the piston receiving section 120 and so forth, the piston receiving section 120 and the rod receiving section 130 may be easily disposed on the same radial extension line L1 with respect to the rotation center C2 of the back plate 5. Therefore, it is possible to further improve the manufacturability and processability of the housing 100 and to reduce the manufacturing cost.

Furthermore, by disposing the parking braking unit 300 at a position separated farther than the main braking unit 200 from the rotation center C1 of the shoe 2, it is possible to stably avoid interference with the chassis 8 when the actuator 310 is disposed. Therefore, a thickness of the housing section 110, in more detail, a thickness of a rear lower portion of the housing section 110 positioned between the actuator 310 and the chassis 8 (for example, a thickness, in a top-and-bottom direction, of the second fastening part 114 disposed under the through extension part 113) may be increased, thereby stably securing the stiffness of the housing section 110.

Referring to FIGS. 4 to 6, the rotation prevention assembly unit 430 in accordance with the embodiment of the present disclosure includes the rotation preventing groove 431 and a rotation preventing projection 432.

The rotation preventing groove 431 is formed at a rear end of the through extension part 113, is formed at an upper edge of the driving shaft receiving part 132 to communicate with the driving shaft receiving part 132, and is formed to be recessed in an extending direction of the driving shaft receiving part 132, that is, in a forward direction. The rotation preventing projection 432 is formed to project upward at an upper portion of the actuator 310, and is assembled by being fitted into the rotation preventing groove 431 in the forward direction.

In a state in which the rotation preventing projection 432 is fitted into the rotation preventing groove 431, the locking part 311 of the actuator 310 is naturally disposed to correspond to the second fastening part 114. Accordingly, the assembly of the actuator 310 may be easily carried out by continuously passing and inserting the second locking member 420 through the locking part 311 and the second fastening part 114.

By locking the second locking member 420 to the second fastening part 114 in the state in which the rotation preventing groove 431 and the rotation preventing projection 432 are fitted and assembled as described above, the load of a rotation torque generated when the actuator 310 is driven may be stably supported, and the rotation and movement of the actuator 310 about the second locking member 420 may be stably prevented. Accordingly, the actuator 310 may be firmly coupled to the housing 100 even with only one second locking member 420.

In accordance with the embodiment of the present disclosure, the first fastening parts 112 and the first locking members 410 are disposed on left and right sides of the driving shaft receiving part 132, the second fastening part 114 and the second locking member 420 are disposed under the driving shaft receiving part 132, and the rotation preventing assembly unit 430 is disposed on a side opposite to the second fastening part 114 based on the center portion of the driving shaft receiving part 132, that is, on the driving shaft receiving part 132.

In a state in which the left part and the right part of the housing 100 are fastened to the back plate 5 by the first locking members 410, by coupling the rotation preventing projection 432 into the rotation preventing groove 431 and fastening the actuator 310 to the lower part of the housing 100 by the second locking member 420, the left and right parts and upper and lower parts of the housing 100 may be firmly coupled to the back plate 5 and the actuator 310, respectively.

As is apparent from the above description, the drum brake apparatus 1 according to the embodiments of the present disclosure, constructed as mentioned above, may disclose an integrated main braking and parking braking structure in which the main braking unit 200 and the parking braking unit 300 are coupled to each other in one housing 100. Thus, a main bake device and a parking brake device may be simultaneously installed through a simple process of installing the housing 100 on the back plate 5.

Therefore, according to the embodiments of the present disclosure, when compared to the conventional art in which a main brake device and a parking brake device are separately fabricated and managed, assembly positions capable of securing a clearance in consideration of the interference between the main brake device and the parking brake device are set and adjusted depending on a specification and then design and assembly are performed, a manufacturing process may be simplified and a gap between the main braking unit 200 and the parking braking unit 300 may be further decreased. As a consequence, it is possible to realize size and weight reduction and improve space utilization efficiency.

In addition, according to the embodiments of the present disclosure, by locking the first locking member 410 and the second locking member 420 to the housing 100, a plurality of components including the actuator 310, the back plate 5 and the housing 100 may be firmly coupled to one another in a state in which the housing 100 and the actuator 310 are disposed on one side and the other side, respectively, of the back plate 5.

Also, according to the embodiments of the present disclosure, since the first locking member 410 and the second locking member 420 are assembled in the state in which the housing 100 and the actuator 310 are disposed on the one side and the other side, respectively, of the back plate 5, the rigidity and structural stability of the back plate 5 may be further improved as compared to a case where the housing 100 and the actuator 310 are pre-assembled and are then post-assembled to the back plate 5 and thus a large hole for the passage of the actuator 310 should be formed in the back plate 5.

Further, according to the embodiments of the present disclosure, since only the actuator 310 may be solely and easily disassembled by unlocking the second locking member 420, the replacement and inspection of the actuator 310 may be performed more easily as compared to a case where one locking member is locked by continuously passing through the actuator 310, the back plate 5 and the housing 100.

Although exemplary embodiments of the disclosure have been disclosed for illustrative purposes, those skilled in the art will appreciate that various modifications, additions and substitutions are possible, without departing from the scope and spirit of the disclosure as defined in the accompanying claims. Thus, the true technical scope of the disclosure should be defined by the following claims.

What is claimed is:

1. A drum brake apparatus comprising:
   a housing;
   a main braking unit disposed on a first portion of the housing, the main braking unit configured to be, during main braking, driven by a hydraulic pressure and pressing a shoe;
   a parking braking unit disposed on a second portion of the housing, the parking braking unit configured to be, during parking braking, driven by an electromotive force of an actuator and pressing the shoe;
   a first locking member configured to fasten the housing to a first surface of a back plate; and
   a second locking member configured to fasten the actuator to the housing on a second surface side of the back plate,
   wherein the housing includes: a housing body, a piston receiving body and a rod receiving body,
   the housing body includes:
   a body part having the piston receiving body and the rod receiving body therein,
   a first fastening part disposed on the body part, and configured to be coupled to the back plate by the first locking member,
   a through extension part disposed at an end of the body part, the through extension part disposed on the second surface side of the back plate and extending through a through hole of the back plate, and
   a second fastening part to which the second locking member is locked.

2. The drum brake apparatus according to claim 1, wherein
   the piston receiving body disposed to be connected to a first portion of the housing body corresponding to the first portion of the housing, the piston receiving body configured to be hollow in which the main braking unit is disposed; and
   the rod receiving body disposed to be connected to a second portion of the housing body corresponding to the second portion of the housing to be hollow, the rod receiving body having the parking braking unit therein and spaced apart from, farther than the piston receiving body, a rotation center of the shoe.

3. The drum brake apparatus according to claim 2, wherein the piston receiving body and the rod receiving body are disposed on a same radial extension line with respect to a rotation center of the back plate, and
   wherein the actuator is disposed on a same radial extension line as a chassis which supports a center portion of the back plate, and is disposed parallel to the rotation center of the back plate.

4. The drum brake apparatus according to claim 1, wherein the first fastening part comprises:
   a left fastening part disposed on a left side portion of the body part, and configured to be coupled to the back plate by the first locking member; and
   a right fastening part disposed on a right side portion of the body part, and configured to be coupled to the back plate by the first locking member,
   wherein the through extension part is disposed between the left fastening part and the right fastening part.

5. The drum brake apparatus according to claim 1, wherein the piston receiving body comprises:
   a cylinder part in which the main braking unit is disposed; and
   a hydraulic flow path part extending from both sides of the through extension part to the cylinder part so as to define a path through which a fluid is supplied into the cylinder part,
   wherein the second fastening part is disposed at a middle portion in a lateral direction of the through extension part and spaced apart from the hydraulic flow path part.

6. The drum brake apparatus according to claim 5, further comprising:
   a rotation preventing assembly unit configured to prevent rotation of the actuator about the second locking member between the housing and the actuator,
   wherein the rod receiving body comprises:
   a rod cylinder in which the parking braking unit is disposed; and
   a driving shaft receiving part, in which an output shaft of the actuator is disposed and connected to the parking braking unit, extending from the through extension part to the rod cylinder part,
   wherein the second fastening part is disposed on a first side of the driving shaft receiving part and spaced apart from the first fastening part, and
   wherein the rotation preventing assembly unit is disposed on a second side of the driving shaft receiving part opposite to the first side of the driving shaft receiving part based on a center portion of the driving shaft receiving part.

7. The drum brake apparatus according to claim 6, wherein the rotation preventing assembly unit comprises:
   a rotation preventing groove through which an edge portion of the driving shaft receiving part communicates with the rotation preventing assembly unit, the rotation preventing groove configured to be recessed in an extending direction of the driving shaft receiving part; and a rotation preventing projection extending on the actuator and configured to be fitted into the rotation preventing groove.

8. The drum brake apparatus according to claim 1, wherein the housing body further comprises a foreign matter introduction prevention part coupled to a side of the body part at which the piston receiving body and the rod receiving body have openings, respectively, wherein the foreign matter introduction prevention part is configured to enclose an edge portion of the piston receiving body and an edge portion of the rod receiving body.

9. The drum brake apparatus according to claim 8, wherein the foreign matter introduction prevention part comprises:

a connecting portion disposed between the opening of the piston receiving body and the opening of the rod receiving body;

a piston sealing portion having a ring shape corresponding to the edge portion of the piston receiving body, the ring shape of the piston sealing portion being continuous with a first portion of the connecting portion, wherein the piston sealing portion has an inner end connected to the main braking unit;

a rod sealing portion having a ring shape corresponding to the edge portion of the rod receiving body, the ring shape of the rod sealing portion continuous with a second portion of the connecting portion, wherein the rod sealing portion has an inner end connected to the parking braking unit; and a body fixing portion disposed on the connecting portion and fixed to the body part.

10. The drum brake apparatus according to claim 1, wherein the main braking unit comprises:

a piston disposed at an end of the housing, the piston configured to reciprocate to be in and out of the housing by a hydraulic pressure and pressing the shoe; and an elastic member disposed in the housing so as to reduce an impact force applied to the piston returning into the housing.

11. The drum brake apparatus according to claim 1, wherein the parking braking unit comprises:

a gear rotatably disposed in the housing in association with the actuator; and a rod connected with the gear, the rod configured to press the shoe when moving out of the housing in association with the gear.

12. The drum brake apparatus according to claim 1, further comprising a rotation preventing assembly unit spaced apart from the second locking member so as to prevent rotation of the actuator about the second locking member by fitting assembly between the housing and the actuator.

13. The drum brake apparatus according to claim 12, wherein the rotation preventing assembly unit comprises:

a rotation preventing groove disposed on one of the housing and the actuator; and a rotation preventing projection extending on the other of the housing and the actuator through the rotation preventing groove.

\* \* \* \* \*